(12) United States Patent
Park et al.

(10) Patent No.: US 12,537,217 B2
(45) Date of Patent: Jan. 27, 2026

(54) RECHARGEABLE BATTERY

(71) Applicant: SAMSUNG SDI CO., LTD., Yongin-si (KR)

(72) Inventors: Seunghee Park, Yongin-si (KR); Soo-Mi Eo, Yongin-si (KR); Jeawoan Lee, Yongin-si (KR); Youngkwang Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 695 days.

(21) Appl. No.: 17/595,555

(22) PCT Filed: May 20, 2020

(86) PCT No.: PCT/KR2020/006579
§ 371 (c)(1),
(2) Date: Nov. 18, 2021

(87) PCT Pub. No.: WO2020/235927
PCT Pub. Date: Nov. 26, 2020

(65) Prior Publication Data
US 2022/0231321 A1     Jul. 21, 2022

(30) Foreign Application Priority Data

May 21, 2019   (KR) .................... 10-2019-0059610

(51) Int. Cl.
*H01M 10/04* (2006.01)
*H01M 50/533* (2021.01)
*H01M 50/538* (2021.01)

(52) U.S. Cl.
CPC ..... *H01M 10/0431* (2013.01); *H01M 50/533* (2021.01); *H01M 50/538* (2021.01); *H01M 2220/20* (2013.01); *H01M 2220/30* (2013.01)

(58) Field of Classification Search
CPC ........... H01M 10/0431; H01M 50/538; H01M 50/533; H01M 2220/20; H01M 2220/30
(Continued)

(56) References Cited

U.S. PATENT DOCUMENTS

| 8,491,673 B2 | 7/2013 | Daidoji et al. |
| 2008/0060189 A1* | 3/2008 | Daidoji ............... H01M 50/566 29/623.1 |

(Continued)

FOREIGN PATENT DOCUMENTS

| CN | 102842735 A | 12/2012 |
| CN | 105826509 A | 8/2016 |

(Continued)

OTHER PUBLICATIONS

International Search Report of corresponding PCT/KR2020/006579, Aug. 28, 2020, 4 pages.
(Continued)

*Primary Examiner* — Allison Bourke
*Assistant Examiner* — Robert Gene West
(74) *Attorney, Agent, or Firm* — Womble Bond Dickinson (US) LLP

(57) ABSTRACT

An aspect of the present invention is to provide a rechargeable battery that implements a high output of an electrode assembly by reducing electrical resistance at a connection portion of a uncoated portion and a lead tab. A rechargeable battery according to an embodiment of the present invention includes: an electrode assembly wound by arranging a separator between electrodes; a lead tab connected to the electrode; and a case which accommodates the electrode assembly and of which the lead tab is drawn to the outside, and the lead tab includes a first tab formed with a first width and a first thickness and connected to an uncoated portion of the electrode, and a second tab formed with a second width
(Continued)

equal to or less than the first width and a second thickness equal to or more than the first thickness, and connected to the first tab.

20 Claims, 12 Drawing Sheets

(58) Field of Classification Search
USPC .......................................................... 429/125
See application file for complete search history.

(56) References Cited

U.S. PATENT DOCUMENTS

| | | |
|---|---|---|
| 2011/0104520 A1 | 5/2011 | Ahn |
| 2016/0126528 A1 | 5/2016 | Park et al. |
| 2016/0141589 A1 | 5/2016 | Kang et al. |
| 2016/0218386 A1* | 7/2016 | Park .................... H01M 50/121 |
| 2017/0084901 A1* | 3/2017 | Doo .................. H01M 10/0431 |
| 2017/0141363 A1 | 5/2017 | Kim et al. |

FOREIGN PATENT DOCUMENTS

| | | |
|---|---|---|
| KR | 10-2011-0048470 A | 5/2011 |
| KR | 10-2015-0043093 A | 4/2015 |
| KR | 10-2016-0052252 A | 5/2016 |
| KR | 10-2016-0059748 A | 5/2016 |
| KR | 10-2016-0091199 A | 8/2016 |
| KR | 10-2016-0118582 A | 10/2016 |
| KR | 10-2017-0057599 A | 5/2017 |
| KR | 10-2018-0000223 A | 1/2018 |
| KR | 10-2018-0009268 A | 1/2018 |

OTHER PUBLICATIONS

Chinese Office Action with English translation issued Jan. 3, 2024, with Search Report dated Nov. 23, 2023, for corresponding Chinese Patent Application No. 202080036945.2 (17 pages).

* cited by examiner

RECHARGEABLE BATTERY

CROSS-REFERENCE TO RELATED APPLICATION(S)

This application is a U.S. National Phase Patent Application of International Application Number PCT/KR2020/006579, filed on May 20, 2020, which claims priority of Korean Patent Application Number 10-2019-0059610, filed on May 21, 2019, the entire content of each of which is incorporated herein by reference.

TECHNICAL FIELD

The present disclosure relates to a rechargeable battery that draws a lead tab connected to an uncoated portion of an electrode to the outside of a case.

BACKGROUND ART

As technology development and demand for mobile devices increase, a demand for rechargeable batteries as energy sources is rapidly increasing. The rechargeable battery is a battery that repeatedly performs charging and discharging unlike a primary battery.

Small-capacity rechargeable batteries are used in small electronic devices that can be portable, such as a mobile phone, a laptop computer and a camcorder, and large-capacity rechargeable batteries can be used as a power source for driving a motor for a hybrid vehicle and an electric vehicle.

For example, the rechargeable battery includes an electrode assembly performing charging and discharging operations, a case accommodating the electrode assembly, and a lead tab drawing the electrode assembly to the outside of the case. The electrode assembly is formed by welding the lead tab to an uncoated portion and winding an electrode and a separator.

However, in the electrode assembly, resistance increases at a portion where the uncoated portion and the lead tab are connected to interfere with a high output of the electrode assembly.

DISCLOSURE

Technical Problem

An aspect of the present invention is to provide a rechargeable battery that implements a high output of an electrode assembly by reducing electrical resistance at a connection portion of a uncoated portion and a lead tab.

Technical Solution

A rechargeable battery according to an embodiment of the present invention includes: an electrode assembly wound by arranging a separator between electrodes; a lead tab connected to the electrode; and a case which accommodates the electrode assembly and of which the lead tab is drawn to the outside, and the lead tab includes a first tab formed with a first width and a first thickness and connected to an uncoated portion of the electrode, and a second tab formed with a second width equal to or less than the first width and a second thickness equal to or more than the first thickness, and connected to the first tab.

The second thickness may be larger than the first thickness.

The first tab may be connected to the uncoated portion with one surface through a surface contact, and partially protruded to the outside of the uncoated portion, and the second tab may be connected to one surface of the first tab through the surface contact.

The second tab may be connected to a side end of the uncoated portion with a side surface in a separation state or a partial contact state.

The second tab may be further connected to the side end of the uncoated portion with the side surface through the surface contact.

The first tab may be connected to a termination uncoated portion of a first electrode (e.g., anode) and a termination uncoated portion of a second electrode (e.g., cathode) among the electrodes.

The first tab may be connected to the leading uncoated portion and the termination uncoated portion of the first electrode (e.g. anode), and connected to the leading uncoated portion and the termination uncoated portion of the second electrode (e.g., cathode) among the electrodes.

The first tab may be further connected to an intermediate uncoated portion of the first electrode, and further connected to the intermediate uncoated portion of the second electrode.

The first tab may be connected to the leading uncoated portion of the first electrode (e.g., anode) and the termination uncoated portion of the second electrode (e.g., cathode) among the electrodes.

The first tab may be connected to the termination uncoated portion of the first electrode (e.g., anode) and the leading uncoated portion of the second electrode (e.g., cathode) among the electrodes.

The first tab may be connected to the intermediate uncoated portion of the first electrode (e.g., anode) and the leading uncoated portion and the termination uncoated portion of the second electrode (e.g., cathode) among the electrodes.

The first tab may be connected to the leading uncoated portion and the termination uncoated portion of the first electrode (e.g., anode) and may be further connected to the intermediate uncoated portion of the second electrode (e.g., cathode) among the electrodes.

Advantageous Effects

According to an embodiment of the present invention, since a lead tab is formed by first and second tabs (inner and outer tabs), and a first tab is formed with a first width and a thickness, a second tab is formed with a second thickness equal to or more than the first thickness and a second width equal to or less than the first width, the first tab (inner tab) is connected to an uncoated portion, and the second tab (outer tab) is connected to the first tab, electrical resistance can be reduced at a connection portion of the uncoated portion and the lead tab. That is, a high output of an electrode assembly can be implemented.

Further, according to an embodiment, a side surface of the second tab (outer tab) is further connected to a side end of the uncoated portion in a separation state or a partial contact state to facilitate a work process. Further, according to an embodiment, since the side surface of the second tab (outer tab) is further connected to the side end of the uncoated portion through a surface contact, the electrical resistance can be further reduced at the connection portion of the uncoated portion and the lead tab.

MODE FOR INVENTION

Figure 1:
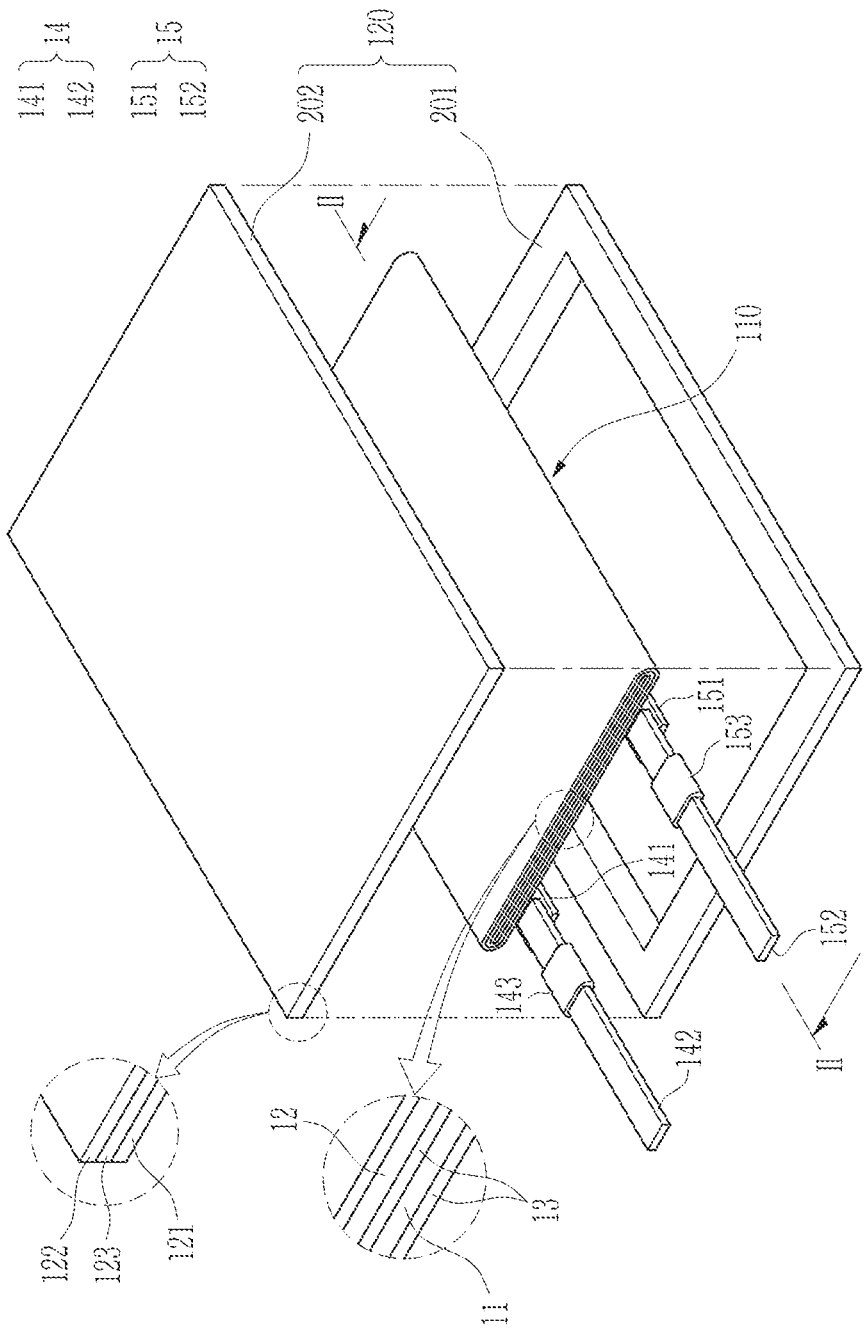
FIG. 1 is an exploded perspective view illustrating a rechargeable battery according to a first embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the scope of the present invention. The drawings and description are to be regarded as illustrative in nature and not restrictive. Like reference numerals designate like elements throughout the specification.

Figure 2:
FIG. 2 is a cross-sectional view taken along line II-II of FIG. 1.

FIG. 1 is an exploded perspective view illustrating a rechargeable battery according to a first embodiment of the present invention and FIG. 2 is a cross-sectional view taken along line II-II of FIG. 1. Referring to FIGS. 1 and 2, the rechargeable battery according to the first embodiment includes an electrode assembly 110 charging and discharging current, a lead tab connected to the electrode assembly 110, and a case (as an example, referred to as a "pouch 120") embedding the electrode assembly 110 and an electrolyte. The lead tab is drawn to the outside of the pouch 120.

The electrode assembly 110 is formed to be accommodated in an internal space of the pouch 120 by arranging and winding electrodes, i.e., a first electrode (for convenience, referred to as an "anode") 11 and a second electrode (for convenience, referred to as a "cathode") 12 on both sides with a separator 13 interposed therebetween, and then pressing a wound outer peripheral surface.

The lead tab includes a first lead tab (for convenience, referred to as an "anode tab") 14 and a second lead tab (for convenience, referred to as a "cathode tab") 15. The anode tab 14 is electrically connected to the anode 11 and the cathode tab 15 is electrically connected to the cathode 12.

Figure 3:
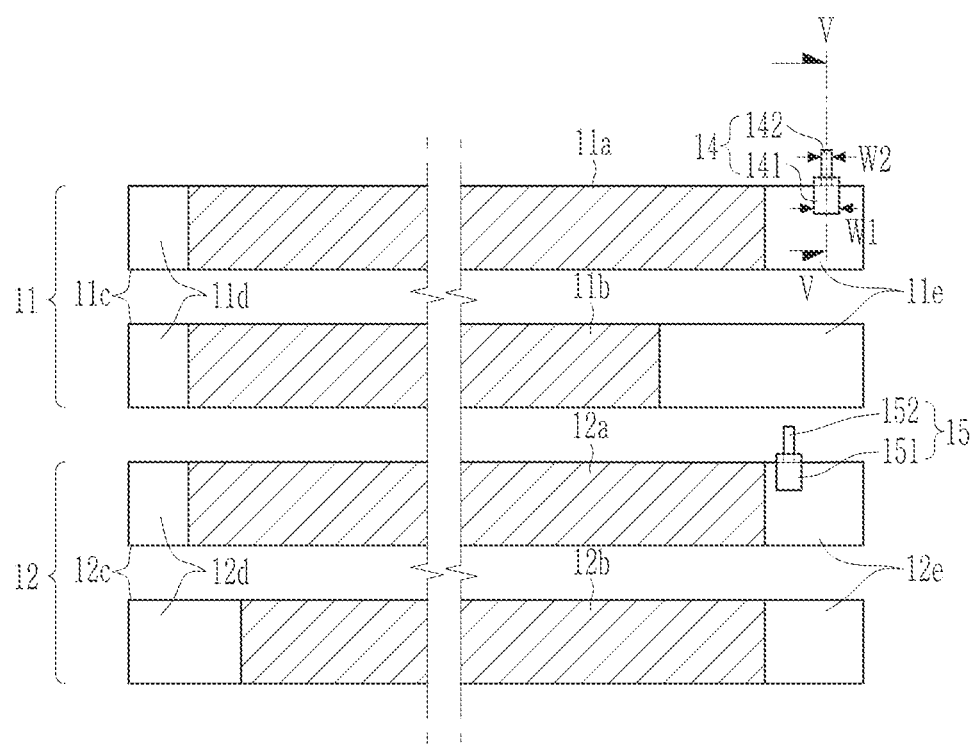
FIG. 3 is a plan view of both surfaces unfolding and illustrating an electrode applied to an electrode assembly of FIG. 1.
Figure 4:
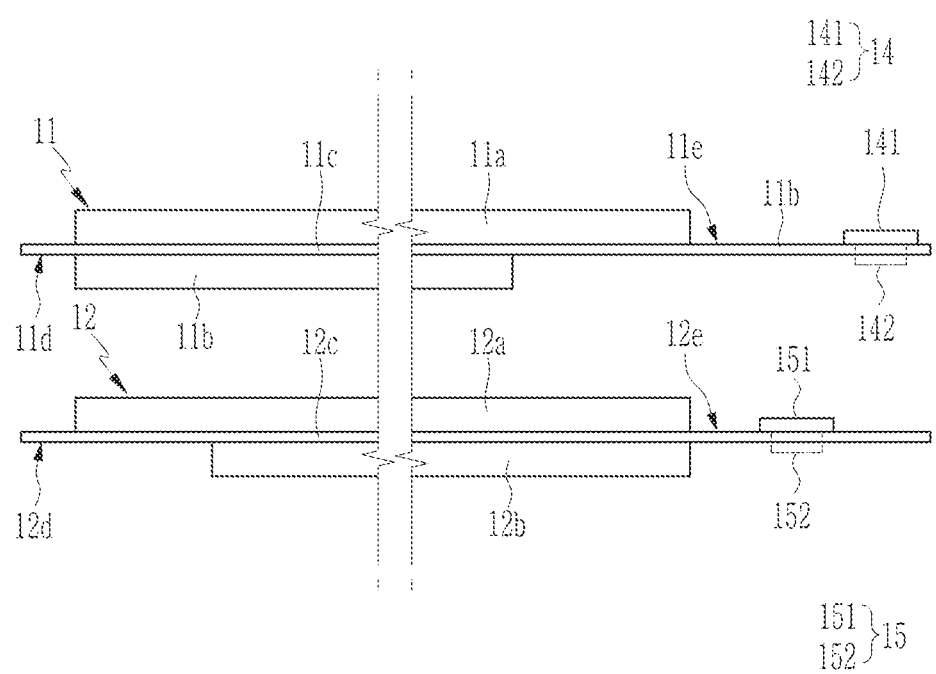
FIG. 4 is a side view of the electrode illustrated in FIG. 3.

FIG. 3 is a plan view of both surfaces unfolding and illustrating an electrode applied to an electrode assembly of FIG. 1 and FIG. 4 is a side view of the electrode illustrated in FIG. 3. For convenience, the separator 13 is omitted in FIGS. 3 and 4.

Referring to FIGS. 3 and 4, the anode 11 includes 11th and 12th coated portions 11a and 11b formed by applying a negative active material onto both surfaces of a current collector 11c of a metal thin plate, and first and second uncoated portions (as an example, leading and termination uncoated portions) 11d and 11e set as the current collector 11c exposed to a leading end and a termination end of the current collector 11c because the negative active material is not applied. For example, the current collector 11c of the anode 11 may be made of aluminum (Al), and the anode tab 14 connected to the anode 11 may also be made of aluminum (Al).

The cathode 12 includes 21st and 22th coated portions 12a and 12b formed by applying a positive active material onto both surfaces of a current collector 12c of the metal thin plate, and third and fourth uncoated portions (as an example, leading and termination uncoated portions) 12d and 12e set as the current collector 12c exposed to the leading end and the termination end of the current collector 12c because the positive active material is not applied. For example, the current collector 12c of the cathode 12 may be made of copper (Cu), and the cathode tab 15 connected to the cathode 12 may also be made of copper (Cu).

The anode and cathode tabs 14 and 15 includes a first tab (for convenience, referred to as inner tabs 141 and 151) and a second tab (for convenience, referred to as outer tabs 142 and 152)

The inner tabs 141 and 151 are connected to the anode and cathode 11 and 12 by ultrasonic welding or laser welding, and drawn to the outside of the electrode assembly 110 and arranged inside the pouch 120.

The outer tabs 142 and 152 are connected to the inner tabs 141 and 151 by the ultrasonic welding or laser welding outside the electrode assembly 110, and drawn to the outside of the pouch 120. That is, the outer tabs 142 and 152 are extended inside and outside the pouch 120.

Figure 5:
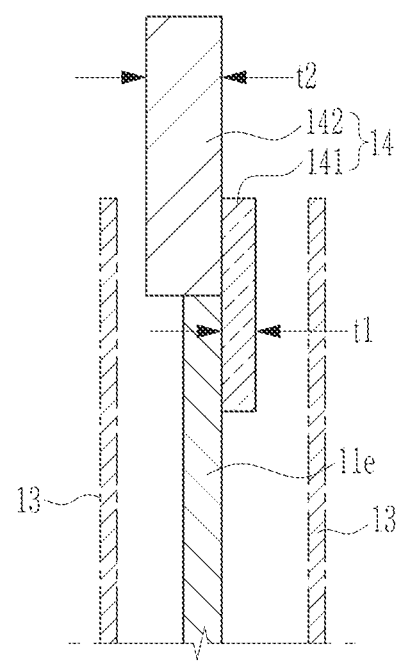
FIG. 5 is a cross-sectional view taken along line V-V of FIG. 3.

FIG. 5 is a cross-sectional view taken along line V-V of FIG. 3. Referring to FIGS. 1 to 5, in the anode and cathode tabs 14 and 15, the inner tabs 141 and 151 are welded to the termination uncoated portions 11e and 12e of the anode and cathode 11 and 12 and drawn to the outside of the electrode assembly 110, and the outer tabs 142 and 152 are welded to the inner tabs 141 and 151 outside the electrode assembly 110.

For convenience, the cathode tabs 15 are not illustrated and the anode tab 14 is illustrated. The inner tabs 141 and 151 are formed with a first width W1 and a first thickness t1, and connected to the termination uncoated portions 11e and 12e of the anode and cathode 11 and 12. The inner tabs 141 and 151 are connected to one surface of each of the termination uncoated portions 11e and 12e through the surface contact and partially protruded outside the termination uncoated portions 11e and 12e.

The outer tabs 142 and 152 are formed with a second width W2 equal to or less than the first width W1 (W2≤W1) and a second thickness t2 equal to or more than the first thickness t1 (t1≤t2), and connected to the inner tabs 141 and 151. The outer tabs 142 and 152 are formed with a second width W2 equal to or less than the first width W1 (W2≤W1) and a second thickness t2 equal to or more than the first thickness t1 (t1≤t2), and connected to the inner tabs 141 and 151. In order to reduce current resistance, the second thickness t2 may also be larger than the first thickness t1' (t1<t2)'

Since the inner tabs 141 and 151 are welded to the termination uncoated portions 11e and 12e with the first width W1 which is a sufficient size through the surface contact, the current resistance which flows between the termination uncoated portions 11e and 12e and the inner tabs 141 and 151 may be reduced.

In addition, since the outer tabs 142 and 152 are welded to the inner tabs 141 and 151 with the second thickness t2 equal to or more than the first thickness t1 (t1≤t2) through the surface contact, the current resistance which flows between the inner tabs 141 and 151 and the outer tabs 142 and 152 may be reduced. That is, since the outer tabs 142 and 152 increase an outer surface area by the second thickness t2, the current resistance is reduced.

As such, since the electrical resistance is reduced in the termination uncoated portions 11e and 12e, connection portions of the inner tabs 141 and 151 and the outer tabs 142 and 152, and the outer tabs 142 and 152 themselves, a high output of the electrode assembly 110 may be implemented.

Meanwhile, the outer tabs 142 and 152 are further connected to side ends of the termination uncoated portions 11e and 12e with the side surfaces through the surface contact. That is, since the outer tabs 142 and 152 are in surface contact with the inner tabs 141 and 151 which are in surface contact with the termination uncoated portions 11e and 12e and in surface contact with the side surfaces of the termination uncoated portions 11e and 12e, contact areas of the outer tabs 142 and 152 and the termination uncoated portions 11e and 12e are increased.

Accordingly, the current resistance which flows between the termination uncoated portions 11e and 12e, and the inner tabs 141 and 151 and the outer tabs 142 and 152 is further reduced, and further, the high output of the electrode assembly 110 may be further implemented.

In this case, the termination uncoated portions 11e and 12e, and the connection portions of the inner tabs 141 and 151 and the outer tabs 142 and 152 are electrically insulated by the separator 13. In addition, the termination uncoated portions 11e and 12e and the inner tabs 141 and 151 are welded to each other, and as a result, a mutual contact may also be firmly formed.

Figure 6:
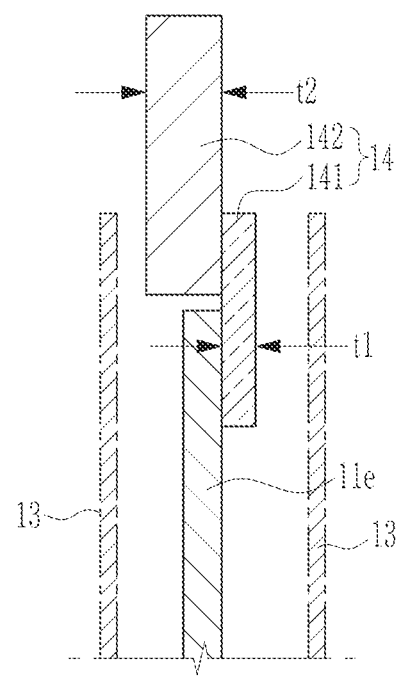
FIG. 6 illustrates another form of the cross-sectional view taken along line V-V of FIG. 3.

FIG. 6 illustrates another form of the cross-sectional view taken along line V-V of FIG. 3. When described by referring to FIGS. 3 and 6, the outer tabs 142 and 152 may also be further connected to the side ends of the termination uncoated portions 11e and 12e with the side surfaces in a separation state or a partial contact state. In this case, a connection task process becomes easier than the case where the outer tabs 142 and 152 described above are in surface contact with the side ends of the termination uncoated portions 11e and 12e with the side surfaces.

Although not illustrated, the outer tab may be in surface contact with an opposite surface of the inner tab. In this case, since the outer tab and the side surface of the termination uncoated portion are not in surface contact with each other, a contact area formed between the termination uncoated portion and the outer tab is smaller than the contact area formed in FIG. 5.

Referring back to FIGS. 1 and 2, the pouch 120 accommodates the electrode assembly 110, and thermally fuses an outer portion to form the rechargeable battery. In this case, the outer tabs 142 and 152 of the anode and cathode tabs 14 and 15 are covered with insulating members 143 and 153, and drawn to the outside of the pouch 120 through a fused portion.

That is, the insulating members 143 and 153 electrically insulate the outer tabs 142 and 152 of the anode and cathode tabs 14 and 15, and electrically insulates the outer tabs 142 and 152 of the anode and cathode tabs 14 and 15, and the pouch 120.

The pouch 120 may be formed in a multi-layered sheet structure covering an exterior of the electrode assembly 110. For example, the pouch 120 includes a polymer sheet 121, and a nylon sheet 122 and a metal sheet 123.

The polymer sheet 121 forms an inner surface of the pouch 120, and insulates and thermally fuses, and the nylon sheet 122 forms an outer surface of the pouch 120 and performs a protection action, and the metal sheet 123 provides a mechanical strength to the pouch 120.

The nylon sheet 122 may also be formed by a polyethyleneterephthalate (PET) sheet or a PET-nylon composite sheet. The metal sheet 123 is interposed between the polymer sheet 121 and the nylon sheet 122, and may also be formed by an aluminum sheet as an example.

Further, the pouch 120 includes a first enclosure 201 and a second enclosure 202. The first and second enclosures 201 and 202 may be formed by the polymer sheet 121, the nylon sheet 122, and the metal sheet 123 of the same layer structure.

For example, the first enclosure 201 is formed in a concave structure so as to accommodate the electrode assembly 110. The second enclosure 202 covers the electrode assembly 110 accommodated in the first enclosure 201, and is formed in parallel so as to be thermally fused to the first enclosure 201 outside the electrode assembly 110.

Although not illustrated, the second enclosure may be integrally connected to the first enclosure in one direction of fourth directions on a plane, and separated in three remaining directions, and as a result, a sealability may be further enhanced in one connected direction.

Hereinafter, various embodiments of the present invention will be described. For convenience, a description of the same configuration as the first embodiment and a pre-described embodiments will be omitted and different configurations will be described.

Figure 7:
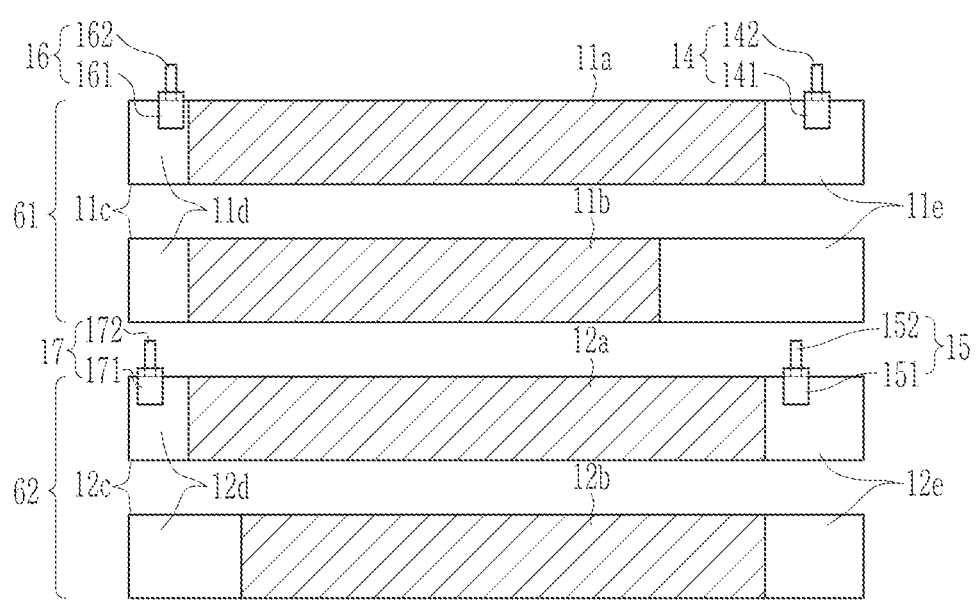
FIG. 7 is a plan view of both surfaces unfolding and illustrating an electrode applied to an electrode assembly of a rechargeable battery according to a second embodiment of the present invention.

FIG. 7 is a plan view of both surfaces unfolding and illustrating an electrode applied to an electrode assembly of a rechargeable battery according to a second embodiment of the present invention. Referring to FIG. 7, in the second embodiment, in the anode tabs 14 and 16 of the anode 61, the inner tabs 141 and 161 are connected to the termination uncoated portion 11e and the leading uncoated portion 11d of the anode 61 respectively. That is, the anode tabs 14 and 16 form multiple tabs. In addition, in the cathode tabs 15 and 17 of the cathode 62, the inner tabs 151 and 171 are connected to the termination uncoated portion 12e and the leading uncoated portion 21d of the cathode 62, respectively. That is, the cathode tabs 15 and 17 form multiple tabs.

As such, two anode tabs 14 and 16 are connected to the termination and leading uncoated portions 11e and 11d of the anode 61, respectively, and two cathodes tabs 15 and 17 are connected to the termination and leading uncoated portions 12e and 12d of the cathode 62, respectively. Accordingly, since each of the anode tabs 14 and 16 and the cathode tabs 15 and 17 are provided in two, the electrical resistance is further reduced to more effectively implement the high output of the electrode assembly as compared with the first embodiment.

That is, as compared with the first embodiment, since the electrical resistance is further reduced in the leading uncoated portions 11d and 12d, connection portions of the inner tabs 161 and 171 and the outer tabs 162 and 172, and the outer tabs 162 and 172 themselves, which are further provided, the high output of the electrode assembly may be more effectively implemented.

Figure 8:
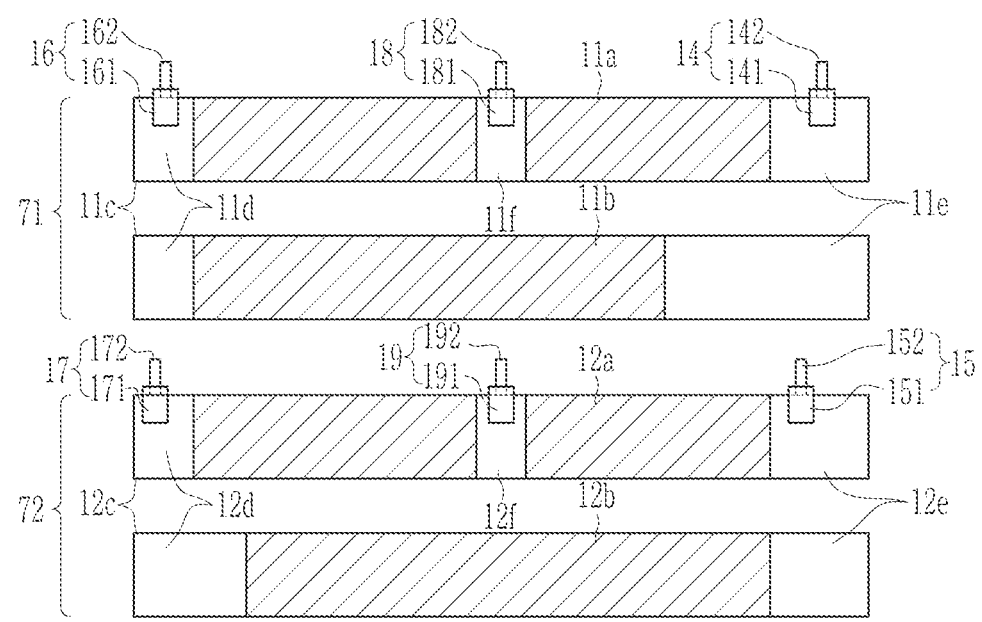
FIG. 8 is a plan view of both surfaces unfolding and illustrating an electrode applied to an electrode assembly of a rechargeable battery according to a third embodiment of the present invention.

FIG. 8 is a plan view of both surfaces unfolding and illustrating an electrode applied to an electrode assembly of a rechargeable battery according to a third embodiment of the present invention. Referring to FIG. 8, in the third embodiment, an anode 71 and a cathode 72 further include intermediate uncoated portions 11f and 12f as compared with the structures of the anode and cathode 61 and 62 in the second embodiment.

In the anode tabs 14, 16, and 18 of the anode 71 the inner tabs 141, 161, and 181 are connected to the termination uncoated portion 11e, the leading uncoated portion 11d, and the intermediate uncoated portion 11f of the anode 71, respectively. In addition, in the cathode tabs 15, 17, and 19 of the cathode 72, the inner tabs 151, 171, and 191 are connected to the termination uncoated portion 12e, the leading uncoated portion 12d, and the intermediate uncoated portion 12f of the cathode 72, respectively.

As such, three anode tabs 14, 16, and 18 are connected to the termination, leading, and intermediate uncoated portions 11e, 11d, and 11f of the anode 71, respectively, and three cathodes tabs 15, 17, and 19 are connected to the termination, leading, and intermediate uncoated portions 12e, 12d, and 12f of the cathode 72, respectively.

Accordingly, since each of the anode tabs 14, 16, and 18 and the cathode tabs 15, 17, and 19 are provided in three, the electrical resistance is reduced to more effectively implement the high output of the electrode assembly as compared with the second embodiment.

That is, as compared with the second embodiment, since the electrical resistance is further reduced in the intermediate uncoated portions 11f and 12f, connection portions of the inner tabs 181 and 191 and the outer tabs 182 and 192, and the outer tabs 182 and 192 themselves, the high output of the electrode assembly may be more effectively implemented.

Figure 9:
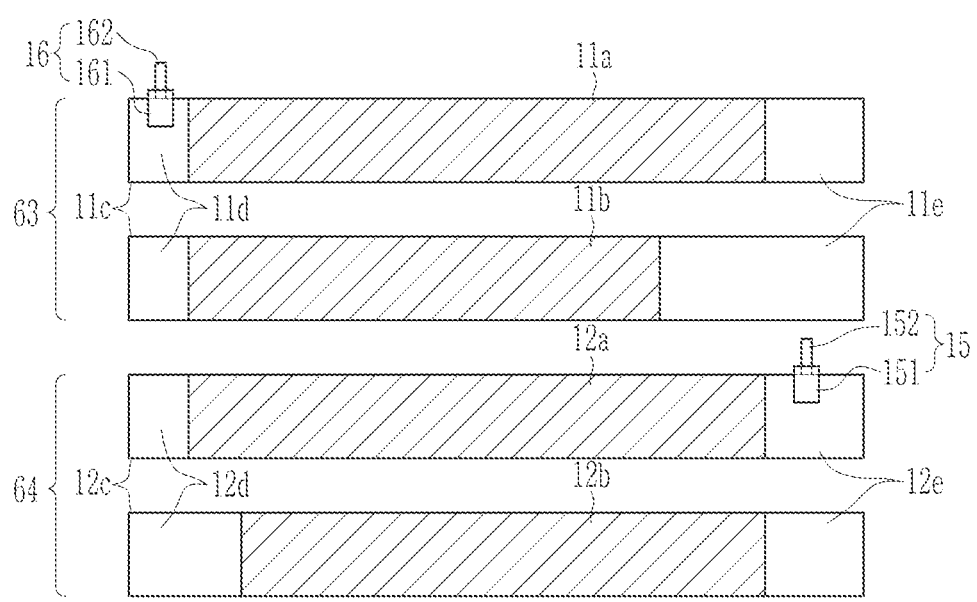
FIG. 9 is a plan view of both surfaces unfolding and illustrating an electrode applied to an electrode assembly of a rechargeable battery according to a fourth embodiment of the present invention.

FIG. 9 is a plan view of both surfaces unfolding and illustrating an electrode applied to an electrode assembly of a rechargeable battery according to a fourth embodiment of the present invention. Referring to FIG. 9, in the fourth embodiment, in the anode tab 16 of the anode 63, the inner tab 161 is connected to the leading uncoated portion 11d of the anode 63. In addition, in the cathode tab 15 of the cathode 64, the inner tab 151 is connected to the termination uncoated portion 12e of the cathode 64.

As such, one anode tab 16 is connected to the leading uncoated portion 11d of the anode 63 and one cathode tab 15 is connected to the termination uncoated portion 12e of the cathode 64. Accordingly, each of the anode tab 16 and the cathode tab 15 are provided in one, and the anode tab 16 and the cathode tab 15 are arranged to cross on the leading end and the termination end, and as a result, as compared with the second embodiment (see FIG. 7), the anode and cathode 16 and 15 are easily arranged, and the electrically resistance such as the first embodiment (see FIG. 3) is reduced to effectively implement the high output of the electrode assembly.

That is, the electrical resistance is reduced in the leading uncoated portion 11d, the connection portion of the inner tab 161 and the outer tab 162, the outer tab 162 itself in the anode 63 and in the termination uncoated portion 12e, the connection portion of the inner tab 151 and the outer tab 152, and the outer tab 152 itself in the cathode 64, and as a result, the high output of the electrode assembly may be effectively implemented as in the first embodiment.

Figure 10:
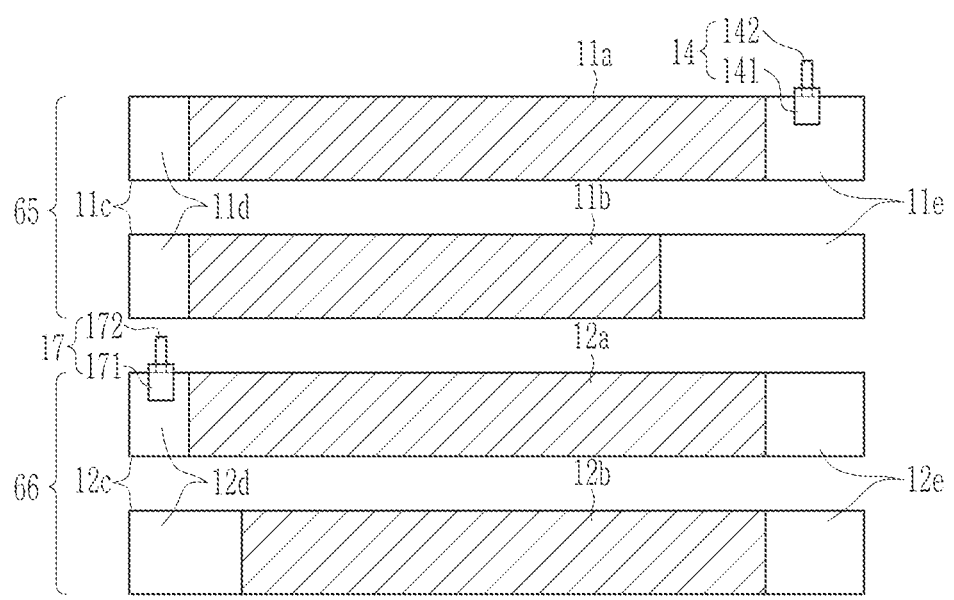
FIG. 10 is a plan view of both surfaces unfolding and illustrating an electrode applied to an electrode assembly of a rechargeable battery according to a fifth embodiment of the present invention.

FIG. 10 is a plan view of both surfaces unfolding and illustrating an electrode applied to an electrode assembly of a rechargeable battery according to a fifth embodiment of the present invention. Referring to FIG. 10, in the fifth embodiment, in the anode tab 14 of the anode 65, the inner tab 141 is connected to the termination uncoated portion 11e of the anode 65. In addition, in the cathode tab 17 of the cathode 66, the inner tab 171 is connected to the leading uncoated portion 12d of the cathode 66.

As such, one anode tab 14 is connected to the termination uncoated portion 11e of the anode 65 and one cathode tab 17 is connected to the leading uncoated portion 12d of the cathode 66. Accordingly, each of the anode tab 14 and the cathode tab 17 are provided in one, and the anode tab 14 and the cathode tab 17 are arranged to cross on the termination end and the leading end, and as a result, as compared with the second embodiment (see FIG. 7), the anode tab 14 and the cathode tab 17 are easily arranged, and the electrically resistance such as the first embodiment (see FIG. 3) is reduced to effectively implement the high output of the electrode assembly.

That is, the electrical resistance is reduced in the termination uncoated portion 11e, the connection portion of the inner tab 141 and the outer tab 142, the outer tab 142 itself in the anode 65 and in the leading uncoated portion 12d, the connection portion of the inner tab 171 and the outer tab 172, and the outer tab 172 itself in the cathode 66, and as a result, the high output of the electrode assembly may be effectively implemented as in the first embodiment.

Figure 11:
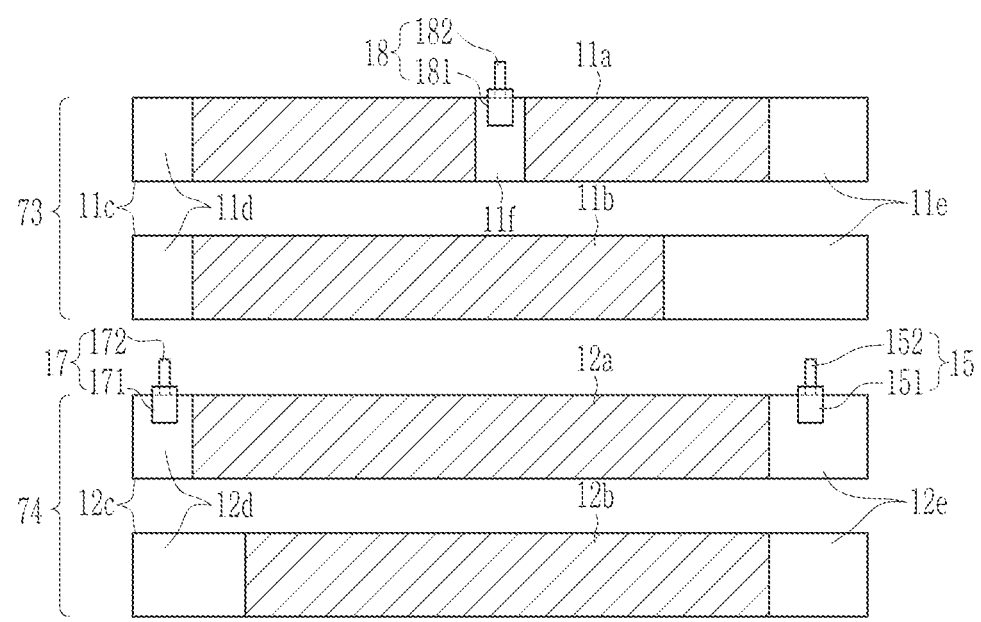
FIG. 11 is a plan view of both surfaces unfolding and illustrating an electrode applied to an electrode assembly of a rechargeable battery according to a sixth embodiment of the present invention.

FIG. 11 is a plan view of both surfaces unfolding and illustrating an electrode applied to an electrode assembly of a rechargeable battery according to a sixth embodiment of the present invention. Referring to FIG. 11, in the fifth embodiment, in the anode tab 18 of the anode 73, the inner tab 181 is connected to the intermediate uncoated portion 11f of the anode 73. In addition, in the cathode tabs 15 and 17 of the cathode 74, the inner tabs 151 and 171 are connected to the termination uncoated portion 12e and the leading uncoated portion 12d of the cathode 74, respectively.

As such, one anode tab 18 is connected to the intermediate uncoated portion 11f of the anode 73 and two cathode tabs 15 and 17 are connected to the termination and leading uncoated portions 12e and 12d of the cathode 74, respectively. Accordingly, since there is one anode tab 18, and there are two cathode tabs 15 and 17 the electrical resistance is further reduced in the cathode 74 to more effectively implement the high output of the electrode assembly as compared with the first embodiment.

Figure 12:
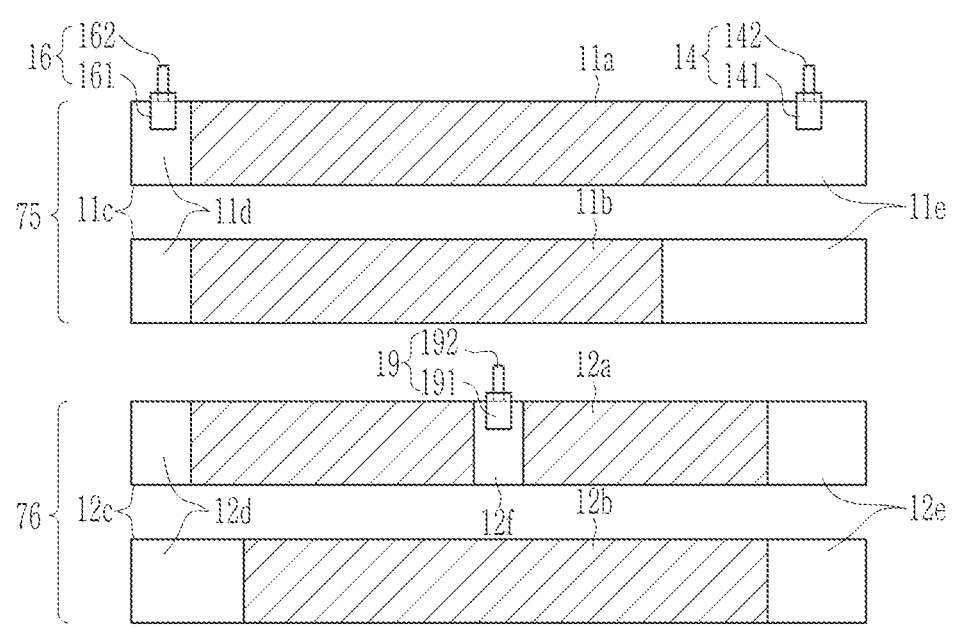
FIG. 12 is a plan view of both surfaces unfolding and illustrating an electrode applied to an electrode assembly of a rechargeable battery according to a seventh embodiment of the present invention.

That is, the electrical resistance is reduced in the intermediate uncoated portion 11f, the connection portion of the inner tab 181 and the outer tab 182, the outer tab 182 itself in the anode 73 and in the termination and leading uncoated portion 12e and 12d, the connection portions of the inner tabs 151 and 171 and the outer tabs 152 and 172, and the outer tabs 152 and 172 themselves in the cathode 74, and as a result, the high output of the electrode assembly may be effectively implemented FIG. 12 is a plan view of both surfaces unfolding and illustrating an electrode applied to an electrode assembly of a rechargeable battery according to a seventh embodiment of the present invention. Referring to FIG. 12, in the seventh embodiment, in the anode tabs 14 and 16 of the anode 75, the inner tabs 141 and 161 are connected to the termination and leading uncoated portions 11e and 11d of the anode 75, respectively. In addition, in the cathode tab 19 of the cathode 76, the inner tab 191 is connected to the intermediate uncoated portion 12f of the cathode 76.

As such, two anode tabs 14 and 16 are connected to the termination and leading uncoated portions 11e and 11d of the anode 75, respectively, and one cathodes tab 19 is connected to the intermediate uncoated portions 12f of the cathode 76. Accordingly, since there are two anode tabs 14 and 16, and there is one cathode tab 19, the electrical resistance is further reduced in the anode 75 to more effectively implement the high output of the electrode assembly as compared with the first embodiment.

That is, the electrical resistance is reduced in the termination and leading uncoated portions 11e and 11d, the connection portions of the inner tabs 141 and 161 and the outer tabs 142 and 162, the outer tabs 142 and 162 themselves in the anode 75 and in the intermediate uncoated portion 12f, the connection portion of the inner tab 191 and the outer tab 192, and the outer tab 192 itself in the cathode 76, and as a result, the high output of the electrode assembly may be effectively implemented.

While this invention has been described in connection with what is presently considered to be practical exemplary embodiments, it is to be understood that the invention is not limited to the disclosed embodiments. On the contrary, it is intended to cover various modifications and equivalent arrangements included within the scope of the appended claims.

| - Description of symbols - | |
|---|---|
| 10: Electrode assembly | 11: First electrode (anode) |
| 11a, 11b: Eleventh, twelfth coating portion | |
| 11c: Current collector | |
| 11d: First uncoated portion (leading uncoated portion) | |
| 11e: Second uncoated portion (termination uncoated portion) | |
| 11f: Intermediate uncoated portion | |
| 12: Second electrode (cathode) | |
| 12a, 12b: Twenty-first, second coating portion | |
| 12c: Current collector | |
| 12d: Third uncoated portion (leading uncoated portion) | |
| 12e: Fourth uncoated portion (termination uncoated portion) | |
| 12f: Intermediate uncoated portion | 13: Separator |
| 14, 16, 18: Anode tab (first lead tab) | |
| 15, 17, 19: Cathode tab (second lead tab) | |
| 61, 63, 65, 71, 73, 75: Anode | 62, 64, 66, 72, 74, 76: Cathode |
| 120: Case (pouch) | 121: Polymer sheet |
| 122: Nylon sheet | 123: Metal sheet |
| 141, 151, 161, 171, 181, 191: Inner tab (first tab) | |
| 142, 152, 162, 172, 182, 192: Outer tab (second tab) | |
| 143, 153: Insulating member | 201: First enclosure |
| 202: Second enclosure | t1: First thickness |
| t2: Second thickness | W1: First width |
| W2: Second width | |

The invention claimed is:

1. A rechargeable battery comprising:
an electrode assembly that is wound and that comprises a separator between electrodes;
a first lead tab connected to a first electrode of the electrodes; and
a case which accommodates the electrode assembly and from which the first lead tab is drawn to the outside,
wherein the first lead tab comprises
a first tab having a first width and a first thickness and connected to an uncoated portion of the first electrode, and
a second tab having a second width equal to or less than the first width and a second thickness equal to or more than the first thickness, and connected to the first tab,
wherein the first tab has a first side surface and a second side surface opposite the first side surface,
wherein:
the first tab is connected to the uncoated portion with the first side surface through a surface contact, and is partially protruded to the outside of the uncoated portion; and
the second tab is connected to the first side surface of the first tab through a surface contact; and
wherein an end surface of the second tab is in direct contact with a side end surface of the uncoated portion.

2. The rechargeable battery of claim 1, wherein the second thickness is larger than the first thickness.

3. The rechargeable battery of claim 1, wherein:
the electrodes comprise the first electrode and a second electrode, and
the rechargeable battery further comprises a second lead tab, the second lead tab comprising
a first tab having a first width and a first thickness and connected to an uncoated portion of the second electrode, and
a second tab having a second width equal to or less than the first width and a second thickness equal to or more than the first thickness, and connected to the first tab of the second lead tab.

4. The rechargeable battery of claim 3, wherein:
the first tab of the first lead tab is connected to a termination uncoated portion of the first electrode, and
the first tab of the second lead tab is connected to a termination uncoated portion of the second electrode.

5. The rechargeable battery of claim 3, wherein
the first tab of the first lead tab comprises a plurality of first tabs connected to a leading uncoated portion of the first electrode and a termination uncoated portion of the first electrode, and
the first tab of the second lead tab comprises a plurality of first tabs connected to a leading uncoated portion of the second electrode and a termination uncoated portion of the second electrode.

6. The rechargeable battery of claim 5, wherein:
the plurality of first tabs of the first lead tab is further connected to an intermediate uncoated portion of the first electrode, and
the plurality of first tabs of the second lead tab is further connected to an intermediate uncoated portion of the second electrode.

7. The rechargeable battery of claim 3, wherein:
the first tab of the first lead tab is connected to a leading uncoated portion of the first electrode, and
the first tab of the second lead tab is connected to a termination uncoated portion of the second electrode.

8. The rechargeable battery of claim 3, wherein:
the first tab of the first lead tab is connected to a termination uncoated portion of the first electrode, and
the first tab of the second lead tab is connected to a leading uncoated portion of the second electrode.

9. The rechargeable battery of claim 3, wherein:
the first tab of the first lead tab is connected to an intermediate uncoated portion of the first electrode, and the first tab of the second lead tab comprises a plurality of first tabs connected to a leading uncoated portion and a termination uncoated portion of the second electrode.

10. The rechargeable battery of claim 3, wherein:
the first tab of the first lead tab comprises a plurality of first tabs connected to a leading uncoated portion and a termination uncoated portion of the first electrode, and
the first tab of the second lead tab is connected to an intermediate uncoated portion of the second electrode.

11. The rechargeable battery of claim 3, wherein an end surface of the second tab of the second lead tab is connected to a side end surface of the uncoated portion through a surface contact.

12. The rechargeable battery of claim 11, wherein:
the first tab of the first lead tab is connected to a termination uncoated portion of the first electrode, and
the first tab of the second lead tab is connected to a termination uncoated portion of the second electrode.

13. The rechargeable battery of claim 11, wherein:
the first tab of the first lead tab comprises a plurality of first tabs connected to a leading uncoated portion of the first electrode and a termination uncoated portion of the first electrode, and
the first tab of the second lead tab comprises a plurality of first tabs connected to a leading uncoated portion of the second electrode and a termination uncoated portion of the second electrode.

14. The rechargeable battery of claim 13, wherein:
the plurality of first tabs of the first lead tab is further connected to an intermediate uncoated portion of the first electrode, and
the plurality of first tabs of the second lead tab is further connected to an intermediate uncoated portion of the second electrode.

15. The rechargeable battery of claim 11, wherein:
the first tab of the first lead tab is connected to a leading uncoated portion of the first electrode, and
the first tab of the second lead tab is connected to a termination uncoated portion of the second electrode.

16. The rechargeable battery of claim 11, wherein:
the first tab of the first lead tab is connected to a termination uncoated portion of the first electrode, and
the first tab of the second lead tab is connected to a leading uncoated portion of the second electrode.

17. The rechargeable battery of claim 11, wherein:
the first tab of the first lead tab is connected to an intermediate uncoated portion of the first electrode, and
the first tab of the second lead tab comprises a plurality of first tabs connected to a leading uncoated portion and a termination uncoated portion of the second electrode.

18. The rechargeable battery of claim 11, wherein:
the first tab of the first lead tab comprises a plurality of first tabs connected to a leading uncoated portion and a termination uncoated portion of the first electrode, and
the first tab of the second lead tab is connected to an intermediate uncoated portion of the second electrode.

19. A rechargeable battery comprising:
an electrode assembly wound by arranging a separator between a first electrode and a second electrode;
a first lead tab connected to the first electrode and a second lead tab connected to the second electrode; and
a case which accommodates the electrode assembly and from which the first and second lead tabs are drawn to the outside,
wherein each of the first lead tab and the second lead tab comprises:
a first tab having a first width and a first thickness and connected to an uncoated portion of the first electrode or second electrode; and
a second tab having a second width equal to or less than the first width and a second thickness equal to or more than the first thickness, and connected to the first tab,
wherein the first tab of at least one of the first lead tab or the second lead tab has a first side surface and a second side surface opposite the first side surface, and
wherein, for the at least one of the first lead tab or the second lead tab:
the first tab is connected to the uncoated portion with the first side surface through a surface contact, and partially protruded to the outside of the uncoated portion;
the second tab is connected to the first side surface of the first tab through a surface contact; and
an end surface of the second tab is in direct contact with a side end surface of the uncoated portion.

20. The rechargeable battery of claim 19, wherein the first tab of the first lead tab and the first tab of the second lead tab have the first side surface and the second side surface opposite the first side surface, and
wherein, for the first lead tab and the second lead tab:
the first tab is connected to the uncoated portion with the first side surface through the surface contact; and
the second tab is connected to the first side surface of the first tab through the surface contact.

* * * * *